March 21, 1961 B. F. LATHAM, JR 2,976,127
APPARATUS FOR MAKING CARBON BLACK
Filed Dec. 1, 1958
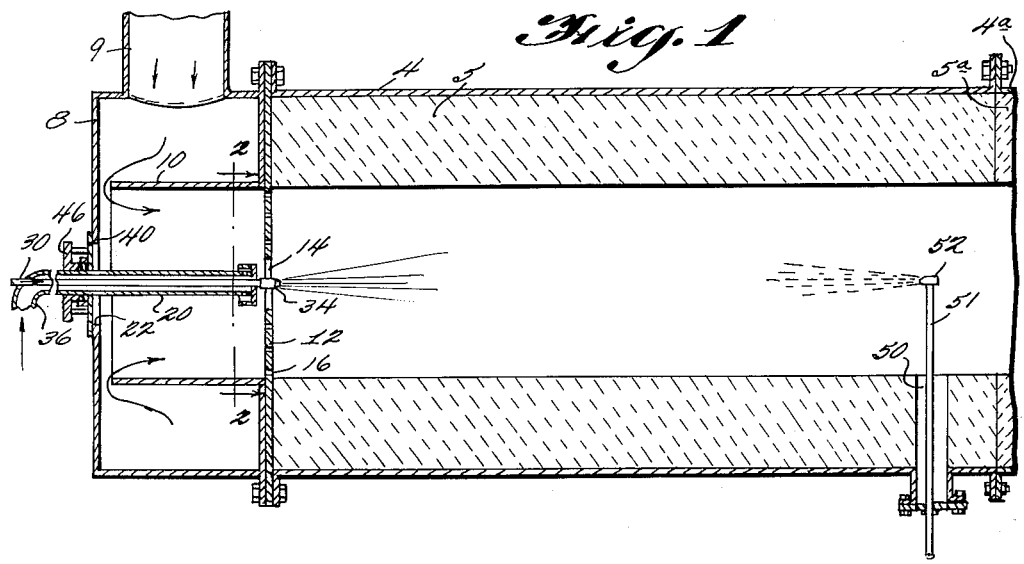
Fig. 1
Fig. 3
Fig. 2
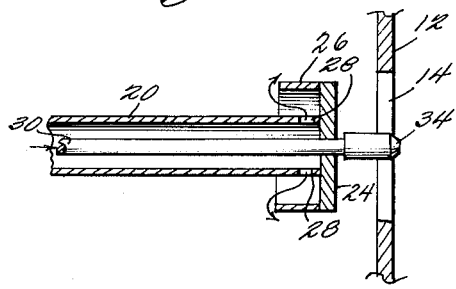
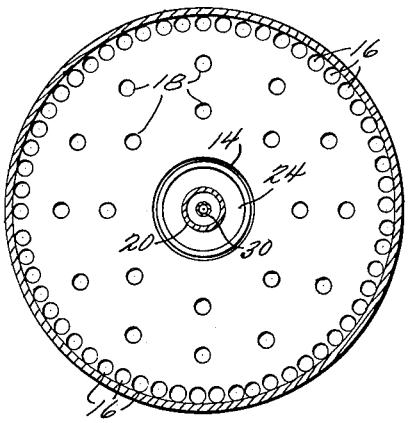
Fig. 4
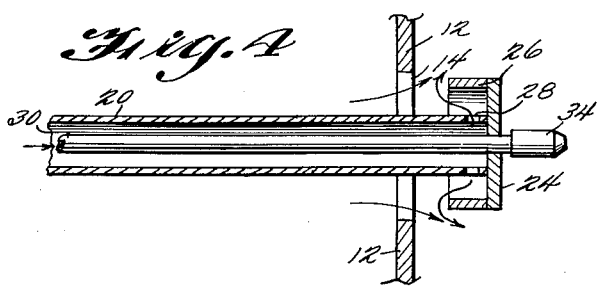
INVENTOR
BURTON F. LATHAM JR.
BY Floyd Trimble
ATTORNEY

United States Patent Office 2,976,127
Patented Mar. 21, 1961

2,976,127

APPARATUS FOR MAKING CARBON BLACK

Burton F. Latham, Jr., Amarillo, Tex., assignor to Continental Carbon Company, Amarillo, Tex., a corporation of Delaware Filed Dec. 1, 1958, Ser. No. 777,427

4 Claims. (Cl. 23—259.5)

This invention relates to the manufacture of carbon black from petroleum oils or any type of hydrocarbons.

It is generally known in the art that the superior grades and smaller particle size blacks are obtained by high temperature cracking reaction which proceeds to its conclusion in the shortest time possible; and that the high temperature is attained by complete combustion of a fuel gas and the injection of hydrocarbon mist or vapor directly into the hot products of combustion. The admission of excess air into the combustion process is usually practiced in order to obtain additional heat from partial combustion of the oil. It is equally well known that rapid mixing of the hydrocarbon mist or vapor with the hot products of combustion is essential for carbon black of the desired small-particle size.

It is among the objects of the present invention to provide an improved apparatus for making carbon black from hydrocarbon, such as petroleum oils, and particularly one wherein the combustion air and fuel gas are mixed by turbulence, the air-gas mixture ignited, and the hydrocarbon (in mist or vapor form) introduced into the flame base at the point where combustion starts; and does not depend on prior complete combustion of gaseous fuel.

Another object is the provision, in an apparatus of the type described, of a cylindrical refractory chamber which is simple and less expensive in that there is no refractory inlet wall.

Another object is the attainment of the foregoing advantages while also reducing the tendency toward the formation of coke on the walls of the cylindrical refractory chamber.

Still another object is to permit such regulation of the zone and degree of flame turbulence as will enable better control of the quality of the carbon black.

The foregoing and other features of the present invention will best be understood and appreciated from the following description of a typical embodiment of the novel apparatus, selected for purposes of illustration and shown in the accompanying drawings in which:

Figure 1 is a longitudinal elevation, partly in section, and illustrating a form of apparatus which embodies the teachings of the present invention;

Figure 2 is a sectional view taken on the line 2—2 of Figure 1 and illustrating in detail a flame holder orifice plate and a flame deflector disk which form part of the novel apparatus; and Figures 3 and 4 are enlarged detailed elevational views, partly in section, which illustrate several different positions of the aforementioned flame deflector disk and the manner in which it controls the flame resulting from the combustion of the air-gas mixture in relation to the oil spray.

Referring more particularly to the drawings, the numeral 4 designates, as part of the reactor, an elongate cylindrical housing or shell which is provided with a conventional refractory lining 5.

Suitably secured to one end of the elongate cylindrical housing is a cylindrical air box 8 of similar diameter which is provided with a radially extending air supply pipe 9.

A cylindrical air baffle 10 is concentrically mounted within the cylindrical air box 8, the same having approximately the same inside diameter as that of the refractory lining 5 of the cylindrical housing 4.

As shown in Figure 1, the side wall of the cylindrical air baffle 10 is imperforate; and its outer end is spaced from the inner surface of the outer end-wall of the cylindrical air box 8. This construction and arrangement permits the air entering the air box 8 to be deflected around the annular space between the cylindrical air baffle 10 and the air box. From this point, the entering air is, as shown by arrows, distributed evenly around the annular opening at the outer end of the cylindrical air baffle 10 as it is moved into the latter.

Between the inner end-wall of the cylindrical air box 8 and the adjacent end of the reactor chamber formed by the elongate cylindrical housing 4 and its refractory lining 5 is a flame holder orifice plate 12 having a large center orifice 14 and a series of smaller peripheral orifices 16 which are adjacent the inner wall of said refractory lining. The flame holder orifice plate 12 is also provided with a series of orifices 18 which are disposed between the large center orifice 14 and the aforementioned peripheral orifices 16, being of approximately the same size as the latter.

A fuel gas pipe 20 is disposed to extend through a sizable aperture 22 in the center of the outer end-wall of the cylindrical air box 8 and along the axis of the cylindrical air baffle 10.

The inner end of the gas pipe 20 carries a flame deflector disk 24 with a rearwardly extending sleeve 26, the inside diameter of which is substantially larger than the outside diameter of the gas pipe. The gas pipe 20 is provided with a series of radial apertures 28 at a position which is closely adjacent the inner, or rearward, surface of the flame deflector disk 24.

The oil supply pipe is shown at 30, the same being concentrically disposed with the gas pipe 20 and extending through a central aperture in the flame deflector disk 24. The inner end of the oil supply pipe 30, which projects beyond the flame deflector disk 24, carries a suitable oil spray nozzle 34.

As shown at the left-hand end of Figure 1, the rearward end of the gas pipe 20 is provided with a right-angular bend 36 through which the oil supply pipe 30 extends.

A plate 40 is detachably secured to the outer surface of the outer end-wall of the cylindrical air box 8, entirely covering the aperture 22.

The center of this detachable plate 40 is apertured to receive the gas pipe 20 with its interiorly disposed oil supply pipe 30, a packing gland 46 also being provided as shown.

The detachability of the plate 40, etc., permits the easy removal of the fuel gas pipe 20, oil supply pipe 30, flame deflector disk 24, and oil spray nozzle 34.

The fuel gas is supplied to the gas pipe 20 and flows along the annular space between the latter and the internally (and concentrically) disposed oil supply pipe 30; and is discharged through the radial apertures 28 in the gas pipe which, as before stated, are closely adjacent the rearward surface of the flame deflector disk 24.

The provision of the flame deflector disk 24 and its rearwardly extending sleeve 26 results in the upstream deflection of the fuel gas as it moves through the radial apertures 28 in the fuel gas pipe 20. This upstream deflection of the fuel gas in the manner immediately aforesaid is, of course, for a comparatively short distance; but, being countercurrent to the flow of air through the comparatively large cylindrical air baffle 10, promotes the intermixing of the air and gas preparatory to its passage through the orifices 16, 17 and 18 in the flame holder orifice plate 12.

The oil which is supplied through the oil supply pipe 30 is discharged into the reactor through the oil spray nozzle 34.

It will be understood that, when vaporized oil is used, the oil spray nozzle 34 may be removed.

The flame holder orifice plate 12 and the flame deflector disk 24 control the distribution and turbulence of the air and fuel gas. Approximately two-thirds (⅔) of the air is distributed into the refractory reaction chamber through the large center orifice 14 in the flame holder orifice plate 12, the remaining one-third (⅓) of the air (sometimes termed the "shielding air") being discharged into the reaction chamber through the smaller peripheral orifices 16 and the intermediately disposed orifices 18. The major portion of the shielding air is discharged through the peripheral apertures 16 and along the iner wall of the refractory lining 5; and this prevents the oil from coming into contact with the refractory and forming coke. The remaining shielding air is discharged into the refractory reaction chamber through the intermediately disposed orifices 18; and this assists in the cooling of the flame holder orifice plate 12.

The conduits (not shown) which supply fuel gas and oil to the gas pipe 20 and the oil supply pipe 30 may be of any convenient flexible design; and, accordingly, the position of the flame deflector disk 24 may be controlled by sliding the said pipes through the packing gland 46. When the flame deflector disk 24 is positioned behind the large center orifice 14, as shown in Figure 3 of the drawings, the air, fuel, gas and resulting flame are directed violently against the injected oil resulting in carbon black which is composed of very fine particles. When the flame deflector disk 24 is disposed in front of the center orifice 14 of the flame holder orifice plate, as shown in Figure 4, the air, fuel, gas and resulting flame are directed away from the injected oil resulting in a carbon black which is characterized by larger particles. Accordingly, control of the quality and grade of the carbon black may be maintained by adjusting the position of the flame deflector disk 24, in the manner described.

Referring to the right-hand portion of Figure 1 of the drawings, the cylindrical refractory reaction chamber is provided with a radial spray port 50 through which there extends a water pipe 51, the latter terminating adjacent the centerline of the reaction chamber and being provided with a spray head 52 which is directed toward the instrumentalities described earlier herein. The water spray delivered by the spray head 52 stops the cracking action.

The carbon black produced in the reactor is removed from the effluent gases by means of any of the collecting devices which are well known to the art; and the effluent gases are discharged to the atmosphere.

In the event additional reaction time is required, additional sections of the elongate cylindrical refractory reactor may be utilized, as indicated at 4a and 5a at the right-hand end of Figure 1; it being understood, however, that the water quench spray would be used to stop the reaction in the last reactor section.

While I have shown and described several specific embodiments of the present invention, it will be readily understood that I do not wish to be limited exactly thereto, since various modifications may be made without departing from the scope of the invention as defined in the appended claims.

I claim:

1. Apparatus for making carbon black comprising a cylindrical combustion chamber; a centrally apertured plate secured to one end of said cylindrical combustion chamber; a cylindrical air box secured to said centrally apertured plate; a cylindrical air baffle disposed concentrically within said cylindrical air box and having a substantially imperforate side-wall; the inside diameter of said cylindrical air baffle being substantially the same as the inside diameter of said cylindrical combustion chamber; the inner end of said cylindrical air baffle terminating in contact with said centrally apertured plate and the outer end thereof terminating proximate, but spaced from, the outer end-wall of said cylindrical air box; means for supplying air to said cylindrical air box; a longitudinally adjustable fuel gas supply pipe disposed axially of said cylindrical air baffle and terminating adjacent said centrally apertured plate; a disk secured to the inner end of said fuel gas supply pipe; said disk being of substantially greater diameter than said fuel gas supply pipe and but slightly less diameter than the central aperture in said plate; the wall of said fuel gas supply pipe having a series of radial apertures disposed adjacent the rearward side of said disk; means carried by said disk for diverting rearwardly fuel gas which flows through said radial apertures; an oil supply pipe disposed concentrically in said fuel gas supply pipe and secured thereto; the inner end of said oil supply pipe extending through, and projecting slightly from, said disk; and means for cooling the hot gases and suspended carbon black to a point where the reaction stops and the gases are sufficiently cool to handle in a carbon black collecting device.

2. Apparatus for making carbon black comprising a cylindrical combustion chamber; a centrally apertured plate secured to one end of said cylindrical combustion chamber; a cylindrical air box secured to said centrally apertured plate; a cylindrical air baffle disposed concentrically within said cylindrical air box and having a substantially imperforate side-wall; the inside diameter of said cylindrical air baffle being substantially the same as the inside diameter of said cylindrical combustion chamber; the inner end of said cylindrical air baffle terminating in contact with said centrally apertured plate and the outer end thereof terminating proximate, but spaced from, the outer end-wall of said cylindrical air box; means for supplying air to said cylindrical air box; a longitudinally adjustable fuel gas supply pipe disposed axially of said cylindrical air baffle and terminating adjacent said centrally apertured plate; a disk secured to the inner end of said fuel gas supply pipe; said disk being of substantially greater diameter than said fuel gas supply pipe and but slightly less diameter than the central aperture in said plate; said centrally apertured plate having a series of apertures disposed adjacent the surface of the inner wall of said cylindrical combustion chamber and providing communication between it and the interior of said cylindrical air box; the wall of said fuel gas supply pipe having a series of radial apertures disposed adjacent the rearward side of said disk; means carried by said disk for diverting rearwardly fuel gas which flows through said radial apertures; an oil supply pipe disposed concentrically in said fuel gas supply pipe and secured thereto; the inner end of said oil supply pipe extending through, and projecting slightly from, said disk; and means for cooling the hot gases and suspended carbon black to a point where the reaction stops and the gases are sufficiently cool to handle in a carbon black collecting device.

3. Apparatus for making carbon black comprising a cylindrical combustion chamber; a centrally apertured plate secured to one end of said cylindrical combustion chamber; a cylindrical air box secured to said centrally apertured plate; a cylindrical air baffle disposed concentrically within said cylindrical air box and having a substantially imperforate side-wall; the inside diameter of said cylindrical air baffle being substantially the same as the inside diameter of said cylindrical combustion chamber; the inner end of said cylindrical air baffle terminating in contact with said centrally apertured plate and the outer end thereof terminating proximate, but spaced from, the outer end-wall of said cylindrical air box; means for supplying air to said cylindrical air box; a longitudinally adjustable fuel gas supply pipe disposed axially of said cylindrical air baffle and terminating adjacent said centrally apertured plate; a disk secured to the inner end of said fuel gas supply pipe; said disk being of substantially greater diameter than said fuel gas supply pipe and but slightly less diameter than the central aperture in said plate; said centrally apertured plate having a series of apertures disposed adjacent the surface of the inner wall of said cylindrical combustion chamber and providing communication between it and the interior of said cylindrical air box; said centrally apertured plate also having a series of apertures between said last-mentioned apertures and said central aperture; the wall of said fuel gas supply pipe having a series of radial apertures disposed adjacent the rearward side of said disk; means carried by said disk for diverting rearwardly fuel gas which flows through said radial apertures; an oil supply pipe disposed concentrically in said fuel gas supply pipe and secured thereto; the inner end of said oil supply pipe extending through, and projecting slightly from, said disk; and means for cooling the hot gases and suspended carbon black to a point where the reaction stops and the gases are sufficiently cool to handle in a carbon black collecting device.

4. Apparatus for making carbon black comprising a cylindrical combustion chamber; a centrally apertured plate secured to one end of said cylindrical combustion chamber; a cylindrical air box secured to said centrally apertured plate; a cylindrical air baffle disposed concentrically within said cylindrical air box and having a substantially imperforate side-wall, the inside diameter of said cylindrical air baffle being substantially the same as the inside diameter of said cylindrical combustion chamber; the inner end of said cylindrical air baffle terminating in contact with said centrally apertured plate and the outer end thereof terminating proximate, but spaced from, the outer end-wall of said cylindrical air box; means for supplying air to said cylindrical air box; a longitudinally adjustable fuel gas supply pipe disposed axially of said cylindrical air baffle and terminating adjacent said centrally apertured plate; a disk secured to the inner end of said fuel gas supply pipe; said disk being of substantially greater diameter than said fuel gas supply pipe and but slightly less diameter than the central aperture in said plate; said disk having a rearwardly extending sleeve; the wall of said fuel gas supply pipe having a series of radial apertures disposed adjacent the rearward side of said disk; an oil supply pipe disposed concentrically in said fuel gas supply pipe and secured thereto; the inner end of said oil supply pipe extending through, and projecting slightly from, said disk; and means for cooling the hot gases and suspended carbon black to a point where the reaction stops and the gases are sufficiently cool to handle in a carbon black collecting device.

References Cited in the file of this patent

UNITED STATES PATENTS

| | | |
|---|---|---|
| 2,117,968 | Lutherer | May 17, 1938 |
| 2,216,508 | Zink | Oct. 1, 1940 |
| 2,632,501 | Clark | Mar. 24, 1953 |
| 2,682,450 | Sweigart et al. | June 29, 1954 |
| 2,825,633 | Steele | Mar. 4, 1958 |

FOREIGN PATENTS

| | | |
|---|---|---|
| 654,864 | Great Britain | July 4, 1951 |
| 519,163 | Canada | Dec. 6, 1955 |